United States Patent
Young et al.

(10) Patent No.: US 6,202,150 B1
(45) Date of Patent: Mar. 13, 2001

(54) AUTO-ESCROWABLE AND AUTO-CERTIFIABLE CRYPTOSYSTEMS

(76) Inventors: Adam Lucas Young, 535 W. 110th St., Apt. 12J; Marcel Mordechay Yung, 605 W. 112th St., Apt. 4H, both of New York, NY (US) 10025

(*) Notice: Subject to any disclaimer, the term of this patent is extended or adjusted under 35 U.S.C. 154(b) by 0 days.

(21) Appl. No.: 08/864,839

(22) Filed: May 28, 1997

(51) Int. Cl.$^7$ .......................................... H06F 1/24
(52) U.S. Cl. ............................ 713/167; 713/155; 713/168
(58) Field of Search .................... 380/278, 279, 380/283, 286, 44; 713/155, 156, 168, 167

(56) References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,625,076 | 11/1986 | Okamoto et al. . |
| 4,641,346 | 2/1987 | Clark et al. . |
| 4,748,668 | 5/1988 | Shamir et al. . |
| 4,881,264 | 11/1989 | Merkle . |
| 4,933,970 | 6/1990 | Shamir . |
| 4,995,082 | 2/1991 | Schnorr . |
| 5,005,200 | 4/1991 | Fischer . |
| 5,097,504 | 3/1992 | Camion et al. . |
| 5,231,668 | 7/1993 | Kravitz . |
| 5,276,737 | 1/1994 | Micali . |
| 5,315,658 | 5/1994 | Micali . |
| 5,557,346 | 9/1996 | Lipner et al. . |
| 5,557,765 | 9/1996 | Lipner et al. . |
| 5,633,928 | 5/1997 | Lenstra et al. . |
| 5,640,454 | 6/1997 | Lipner et al. . |
| 5,647,000 | 7/1997 | Leighton . |
| 5,796,830 | 8/1998 | Johnson et al. . |
| 5,805,712 * | 9/1998 | Davis ....................................... 380/50 |
| 5,815,573 | 9/1998 | Johnson et al. . |

(List continued on next page.)

OTHER PUBLICATIONS

Schneier, Applied Cryptography, 1995.*
Schneier, Applied Cryptography, section 24.9, pp. 574–576, 1996.*
R. Anderson, M. Roe, "The GCHQ Protocol and Its Problems", Eurocrypt '97, pp. 134–148, Springer–Veriag 1997.

(List continued on next page.)

*Primary Examiner*—Thomas R. Peeso
(74) *Attorney, Agent, or Firm*—Schweitzer Cornman Gross & Bondell LLP

(57) ABSTRACT

A method is provided for an escrow cryptosystem that is overhead-free, does not require a cryptographic tamper-proof hardware implementation (i.e., can be done in software), is publicly verifiable, and cannot be used subliminally to enable a shadow public key system. A shadow public key system is an unescrowed public key system that is publicly displayed in a covert fashion. The key generated by the method are auto-recoverable and auto-certifiable (abbrev. ARC). The ARC Cryptosystem is based on a key generation mechanism that outputs a public/private key pair, and a certificate of proof that the key was generated according to the algorithm. Each generated public/private key pair can be verified efficiently to be escrowed properly by anyone. The verification procedure does not use the private key. Hence, the general public has an efficient way of making sure that any given individual's private key is escrowed properly, and the trusted authorities will be able to access the private key if needed. Since the verification can be performed by anyone, there is no need for a special trusted entity, known in the art as a "trusted third party". The cryptosystem is overhead free since there is no additional protocol interaction between the user who generates his or her own key, and the certification authority or the escrow authorities, in comparison to what is required to submit the public key itself in regular certified public key systems. Furthermore, the system is designed so that its internals can be made publicly scrutinizable (e.g., it can be distributed in source code form). This differs from many schemes which require that the escrowing device be tamper-proof hardware.

59 Claims, 5 Drawing Sheets

U.S. PATENT DOCUMENTS

| | | | |
|---|---|---|---|
| 5,872,849 | * | 2/1999 Sudia | 380/49 |
| 5,917,912 | * | 6/1999 Ginter et al. | 380/24 |
| 5,937,066 | * | 8/1999 Gennaro et al. | 380/21 |

OTHER PUBLICATIONS

M. Bellare, P. Rogaway, "Optimal Asymmetric Encryption", Eurocrypt '94, pp. 92–111, Springer–Verlag, 1994.

D. Chaum, "Blind Signatures For Untraceable Payments".

D. Chaum, T.P. Pedersen, "Wallet Databases with Observers".

D. Denning, D. Branstad, "A Taxonomy for Key Escrow Encryption Systems", Communications of the ACM, v. 39, n. 3,, 1996.

A. De Santis, Y. Desmedt, Y. Frankel, M. Yung, "How to Share a Function Securrely", ACM STOC '94, pp. 522–533, 1994.

Y. Desmedt, Y. Frankel, "Threshold cryptosystems", CRYPTO '89, pp. 307–315, Springer–Verlag, 1989.

Y. Desmedt, "Securing Traceability of Ciphertexts—Towards a Secure Software Key Escrow System", Eurocrypt '95, pp. 147–157, Springer–Verlag, 1995.

W. Diffie, M. Hellman, "New Directions in Cryptography", IEEE Transactions on Information Theory, 22, pp. 644–654, 1976.

T. ElGamal, "A Public Key Cryptosystem and a Signature Scheme Based on Discrete Logarithms", CRYPTO '84, pp. 10–18, Springer–Verlag, 1985.

P. Feldman, "A Practical Scheme for Non–interactive Verifiable Secret Sharing", 28th annual FOCS, pp. 427–437, 1987.

A Fiat, A. Shamir, "How to Prove Yourself: Practical Solutions to Identification and Signature Problems", CRYPTO '86, pp. 186–194, Springer–Verlag, 1987.

Y. Frankel, M. Yung, "Escrow Encryption Systems Visited: Attacks, Analysis and Designs", CRYPTO '95, Springer–Verlag, 1995.

R. Ganesan, "How To Use Key Escrow", Communications of the ACM, v. 39, n.3, p. 33, 1996.

S. Goldwasser, S. Micali, R. Rivest, "A Digital Signature Scheme Secure Against Adaptive Chosen–Message Attacks", SIAM Journal on Computing, vol. 17, n. 2, 1988.

IBM, SecureWay, key recovery technology document, available at http://www.ibm.com/Security/html/wp–keyrec.html-(downloaded May 25, 1997).

N. Jefferies, C. Mitchell, M. Walker, "A Proposed Architecture for Trusted Third Party Services", Cryptography: Policy and Algorithms, LNCS 1029, Springer, 1996.

J. Kilian, F. Leighton, "Fair Cryptosystems, Revisited", CRYPTO '95, pp. 208–221, Springer–Verlag, 1995.

L. Lacy, D. Mitchell, W. Schell, "CryptoLib: Cryptography in Software", AT&T Bell Labs, Crypto@research.att.com.

A. Lenstra, P. Winkler, Y. Yacobi, "A Key Escrow System with Warrant Bounds", CRYPTO '95, pp. 197–207, Springer–Verlag, 1995.

S. Micali, "Fair Public–Key Cryptosystems", CRYPTO '92, pp. 113–138, Springer–Verlag, 1992.

K. Nyberg, R. Rueppel, "Message Recovery for Signature Schemes Based on the Discrete Logarithm Problem".

T.P. Pedersen, "A Threshold Cryptosystem without a Trusted Party".

E. Verheul, H. Tilborg, "Binding ElGamal: A Fraud–Detectable Alternative to Key–Escrow Proposals", Eurocrypt '97, pp. 119–133, Springer–Verlag, 1997.

S. Walker, J. Winston, "Principles for Use of Encryption and Key Recovery", available at http://www.tis.com/docs/products/recoverkey/recoverkey.html(downloaded May 25, 1997).

A. Young, M. Yung, "Kleptography: Using Cryptography Against Cryptography", Eurocrypt '97 , pp. 62–74, Springer–Verlag, 1997.

"Digital Systems", CRC Handbook of Applied Cryptography, Ch 11, pp. 425–444.

"Digital Systems", CRC Handbook of Applied Cryptography, Ch 11, pp. 445–464.

"Digital Systems", CRC Handbook of Applied Crytography, Ch 11, pp. 465–481.

* cited by examiner

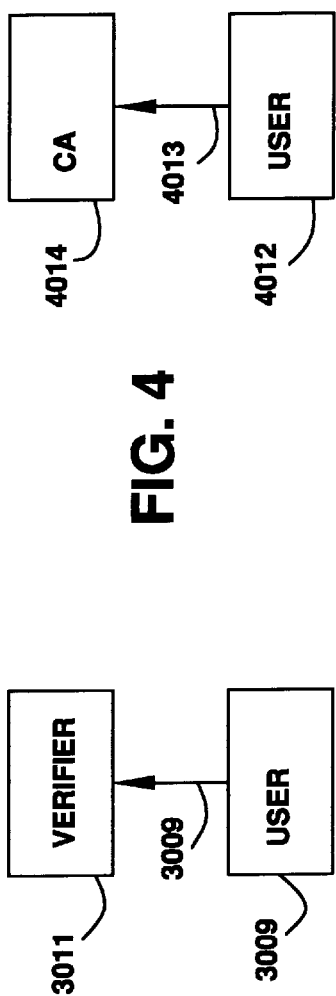
FIG. 3
FIG. 4
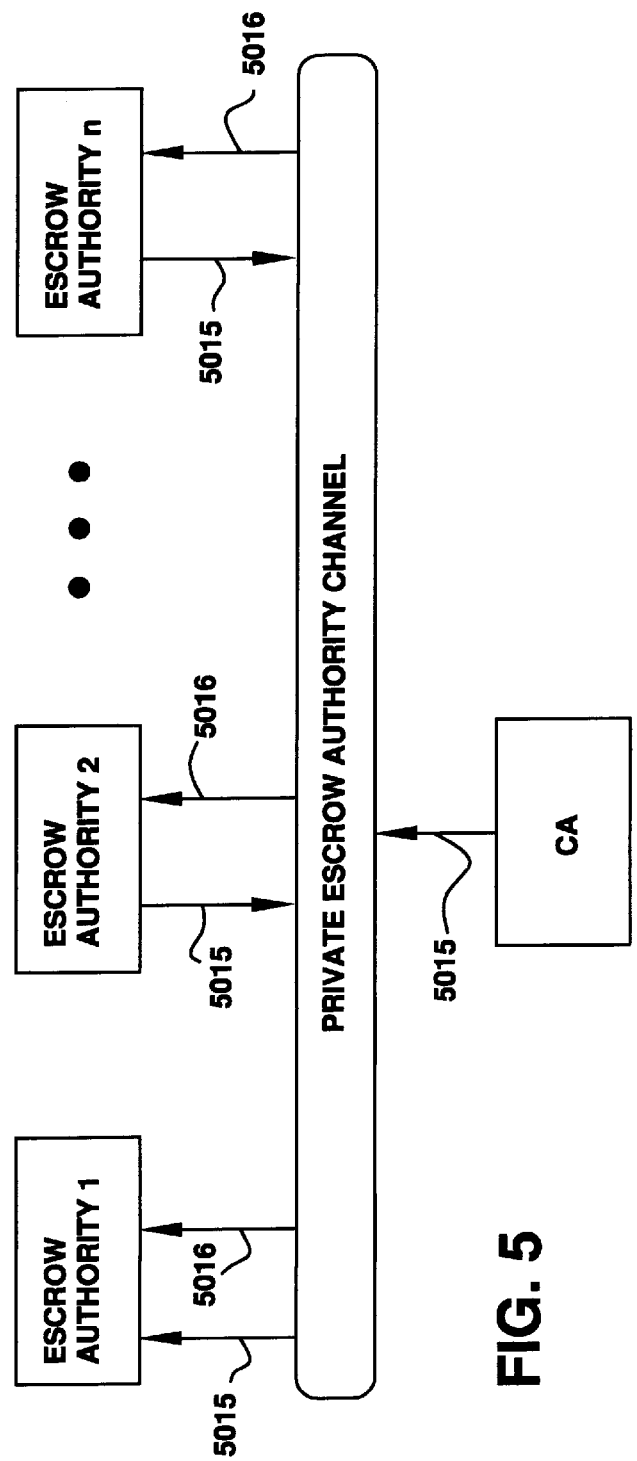
FIG. 5

AUTO-ESCROWABLE AND AUTO-CERTIFIABLE CRYPTOSYSTEMS

BACKGROUND

1. Field of Invention

The field of this invention is cryptography. This invention relates to cryptosystems, and in particular to the escrowing and recovering of cryptographic keys and data encrypted under cryptographic keys. The escrow and recovery process assures that authorized entities like law-enforcement bodies, government bodies, users, and organizations, can when allowed or required, read encrypted data. The invention relates to cryptosystems implemented in software, but is also applicable to cryptosystems implemented in hardware.

2. Description of Prior Art

Public Key Cryptosystems (PKC's) allow secure communications between two parties who have never met before. The notion of a PKC was put forth in (W. Diffie, M. Hellman, "New directions in cryptography", IEEE Transactions on Information Theory, 22, pages 644–654, 1976). This communication can take place over an insecure channel. In a PKC, each user possesses a public key E and a private key D. E is made publicly available by a key distribution center, also called certification authority (CA), after the registration authority verifies the authenticity of the user (its identification, etc.). The registration authority is part of the certification authority. D is kept private by the user. E is used to encrypt messages, and only D can be used to decrypt messages. It is computationally impossible to derive D from E. To use a PKC, party A obtains party B's public key E from the key distribution center. Party A encrypts a message with E and sends the result to party B. B recovers the message by decrypting with D. The key distribution center is trusted by both parties to give correct public keys upon request. A PKC based on the difficulty of computing discrete logarithms was published in (T. ElGamal, "A Public-Key Cryptosystem and a Signature Scheme Based on Discrete Logarithms", CRYPTO '84, pages 10–18, Springer-Verlag, 1985).

PKC's are highly convenient in terms of use, and permit users to conduct private communications over insecure channels. They may be used to initiate symmetric key systems like DES (Data Encryption Standard). PKC's have a drawback, however. Criminals can use PKC's in the course of criminal activity, since no provision is made to supply law enforcement with the necessary decryption keys and untappable criminal communications may result. It is therefore desirable to permit private communications exclusively to law abiding citizens. A general solution to this problem is to have each user submit a representation of his or her private key to trusted escrow authorities, or trustees. The shares are taken out of escrow in the event of a court authorized wire tap. Alternatively, key escrow provides a way to recover lost private keys in an organization, or keys of a file system.

Let us review some of the key escrow systems and show that all require more than a PKC alone. U.S. Pat. Nos. 5,276,737, and 5,315,658 to Micali (1994) disclose a Fair Public Key Cryptosystem (FPKC) (see also, S. Micali, "Fair Public-Key Cryptosystems", CRYPTO '92, pages 113–138, Springer-Verlag, 1992) which satisfies the needs of law abiding citizens and law enforcement (and is based on P. Feldman, 28th annual FOCS). Micali's preferred embodiment discloses how to convert the Diffie-Hellman PKC, and the RSA PKC into Fair PKC's. In the preferred embodiment of the Fair Diffie-Hellman PKC, each user submits five shares to five central trustees (also known as "trusted third parties") to register a public key. This solution is therefore not very scalable, since it requires the use of a small number of trusted authorities, and is thus very centralized. In the present invention, the user constructs a key pair such that the private key is provably escrowed automatically. Hence, no trusted third parties are needed whatsoever. The escrowed information can be sent to one of a multitude of decentralized certification authorities (CA's). In Micali's scheme each trustee verifies their respective shares. Provided the share is valid, the share is stored in a database. Each trustee then signs the values that were received and gives them to a key management center. The five authorities have the burden of securing and managing five private databases of shares. In the present embodiment, the key information is verified by a CA. Provided it has the correct form, the key is signed, and placed immediately in the database of public keys. There need only be one private database. Since only the CA is needed to manage user keys in the current embodiment, the least amount of communication overhead that is possible is achieved. In the Fair PKC's, only the trustees can verify that a key is escrowed properly. Verification is required since without it a user can easily generate keys which are not recoverable. In the current invention, everyone can verify this. This is particularly useful if, for example, a citizen suspects that a CA is failing to insure that its keys are properly escrowed.

It has been shown that the Fair RSA PKC does not meet certain needs of law enforcement (J. Kilian, F. Leighton, "Fair Cryptosystems Revisited", CRYPTO '95, pages 208–221, Springer-Verlag, 1995), since a shadow public key cryptosystem can be embedded within it. A shadow public key system is a system that can be embedded in a key escrow system that permits conspiring users to conduct untappable communications.

The flaw in the RSA FPKC lies in the fact that it is assumed that criminals will use the same secret keys that were provided to the escrow authorities. The shadow cryptosystems make use of what is known in the art as subliminal channels that exist in the public keys of the PKC's. These channels are used to display the public keys of the shadow PKC. The Kilian and Leighton paper discloses how to convert PKC's into Fail-safe Key Escrow (FKE) systems. Specifically, they disclose how to construct FKE systems for discrete-log based PKC's like Diffie-Hellman and DSS. In their expensive protocol, the user and the trusted authorities engage in a protocol to generate the user's public and private keys. In so doing, the authorities are convinced that no subliminal information is contained in the resulting public key. The user is also convinced that the keys are escrowed properly. This system is similar to the Fair Diffie-Hellman PKC, except for the added overhead of this protocol. It is thus subject to the same inefficiencies as the Fair Diffie-Hellman PKC. In the present invention, the user chooses his or her own keys independently. With respect to the threat of shadow PKC's, the present invention relies on the fact that there is no known way to inconspicuously embed a significant number of bits within a modular exponentiation in a finite field. Hence, the exploitation of shadow cryptosystems in discrete-log PKC's seems remote.

DeSantis et al. teach an escrow system where trustees are able to open only messages in session rather than opening the key of the party suspected of criminal activity. This refines the notion of Fair Cryptosystems. Other technologies that teach how to open the session key of users rather than their permanent public key is by Walker and Winston (TIS) and the IBM SecureWay document. These key recovery technologies require that users be aware of and use the keys of the set of trustees at any session initiation. These technologies may be overburdening each and every user since they require new protocol extensions which are used in every communication session and further require users to store many keys beyond what is needed for a PKI.

A "Fraud-Detectable Alternative to Key-Escrow Proposals" based on ElGamal has been described in (E. Verheul, H. van Tilborg, "Binding ElGamal: A Fraud-Detectable Alternative to Key-Escrow Proposals", Eurocrypt '97, pages 119–133, Springer-Verlag, 1997). This system allows users to send encrypted information along with a short proof that the encrypted information can be recovered by a set of trustees. So, this system has the advantage that it does not depend on trusted third parties. However, this system requires an already existing Public Key Infrastructure (PKI). Therein lies the flaw in the Binding ElGamal approach: If the PKI is unescrowed then user A can public key encrypt a message using user B's public key, and then send the resulting ciphertext message using Binding ElGamal. In this case, the proof simply serves to show that the trustees can recover this ciphertext, and therefore prevents law-enforcement from being able to monitor the communications of users suspected of criminal activity. When this abuse is employed, fraud is not detectable. This abuse is made possible because user B's private key is not escrowed. Software that abuses the Binding ElGamal scheme could be readily distributed and could severely hamper attempts at law enforcement on a large-scale. The present invention discloses a method of establishing an escrowed PKI, and is hence not subject to this drawback. Like in Binding ElGamal, the present invention employs the general technique of non-interactive zero-knowledge proofs, though the proofs of the present invention involve new technology. A heuristic for how to construct such proofs was shown in (A. Fiat, A. Shamir, "How to Prove Yourself: Practical Solutions to Identification and Signature Problems", CRYPTO '86, pages 186–194, Springer-Verlag, 1987).

An overview of key escrow schemes appears in (D. Denning, D. Branstad, "A Taxonomy for Key Escrow Encryption Systems," Communications of the ACM, v. 39, n. 3, 1996). In (N. Jeffries, C. Mitchell, M. Walker, "A Proposed Architecture for Trusted Third Party Services", Cryptography: Policy and Algorithms, LNCS 1029, Springer, 1996) and (R. Anderson, "The GCHQ Protocol and Its Problems", Eurocrypt '97, pages 134–148, Springer-Verlag, 1997) a trusted third party approach to escrow is described where the trusted third parties of the participating users are involved in every session key establishment stage.

All key escrow solutions heretofore known suffer from some if not most of the following disadvantages.

(a) they require tamper-resistant implementation, or otherwise require hardware implementation. This imposes high implementation costs and slow establishment of use.

(b) they require use of classified or otherwise proprietary algorithms. This may be unacceptable to users who may be skeptical about the devices security or operation.

(c) they are implemented in software, and are therefore subject to alteration, resulting in improper operation and possibly untappable communications. This is however, an inherent problem of any software solution (all we can require in this case is that if users employ the software apparatus solely for achieving privacy then their plaintext or keys are recoverable).

(d) they require excessive protocol interaction in key generation and/or general use. In addition this interaction may be conducted with a small set of centralized entities, thus making traffic and communication delays a potential bottleneck. They may require users to possess the trustees keys and use them in every session initiation, and further require modifications to every communication protocol.

(e) they require excessive numbers of trusted third parties (TTP) to be involved in system operation. Spreading the trust among too many parties increases the risk of security breaches and reduces scalability.

(f) they require generation of cryptographic keys by TTP's. A corrupt or otherwise compromised TTP may put user security at risk by tampering or disclosing user's keys.

(g) they require the securing and management of database (s) of secret keys or secret shares on behalf of users.

(h) they can be used to establish a shadow public key infrastructure, thus defeating the purpose of the escrow system altogether.

Auto-Recoverable and Auto-Certifiable Cryptosystems

Due to the above disadvantages, what is required is a new mechanism incorporating the following advantages:

(a) a key escrow system that can be distributed in source code form with no loss of security, and hence provides a system that can be publicly scrutinized to insure that it operates properly. Furthermore, since the key escrow system can be available in software, it can be implemented on a large scale, quickly, and cost-effectively. This implies fast distribution of the system.

(b) in the case that a software solution is deemed unacceptable due to the possibility of modifying of the invention, it can be implemented directly in tamper-resistant hardware. This however adversely affects the gains from (a) (e.g., the easy distribution).

(c) the escrow system requires the least amount of protocol interaction between the escrow authorities, CA, and user, that is theoretically possible. To register a key, a message need only be sent to one of a multitude of CA's. This mechanism is called a key registration based escrow system. In comparison, in the preferred embodiment of Fair PKC's, five messages are sent from the user to the trustees, and then five more messages are sent to a key management center.

(d) only one private database is required to implement the escrow system. This database need only be authenticated and may be kept private to prevent a shadow PKC from being established. User's private keys will not be exposed if the database is exposed. This contrasts with Fair PKC's in which several databases must be maintained and if they are compromised, the users keys are compromised. This requirement makes the new system rely only on the CA in establishing and certifying users keys as in usual public key systems.

(e) the escrow system allows the user's private key to be verified by anyone. The verification establishes that the private key is recoverable by the escrow authorities given the user's corresponding public key, the certificate, and public parameters. In comparison, in Fair PKC's, only the trustees perform this verification. This requirement of the new system is called universal verifiability.

(f) the escrow system can be made shadow public key resistant. Fair PKC's were shown not to be shadow public key resistant, namely they can be abused to publish other PKC schemes (J. Kilian, F. Leighton, "Fair Cryptosystems Revisited", CRYPTO '95, pages 208–221).

The present invention is versatile enough so that either (a) or (b) can be chosen (namely, a software or hardware implementation). In each case requirements (c) through (f) are met.

SUMMARY OF THE INVENTION

In order to provide for the above and other objectives and features to be described below, the present invention introduces a new paradigm in cryptography. The present invention provides a method to verify that a user generated private key is contained within an encryption under the public key of the escrow authorities without excessive overhead. Furthermore, this verification can be performed by anyone in possession of the escrow authorities public key. The present invention consists of a setting up process and three functions which process signals in different ways. The functions are key generation, key verification, and key recovery. In the setup process of the preferred embodiment, the participants agree upon a set of initial public parameters and the authorities generate an escrowing public key and corresponding private keys. The initial parameters and the escrowing public key are the public parameters of the system. The escrowing authorities, Certification Authority (CA), and users of the system all have access to the public parameters. In the key generation process, the method generates a user's public/private key pair, and a certificate of recoverability which is a string of information which includes an implicit encryption of the user's private key under the escrowing public key. The signal information containing the user's public key, and the certificate of recoverability can be transmitted to any entity. In the verification process, the user transmits this signal to the verifier. The verification process takes the input signal, processes it, and outputs either true or false. A result of true indicates that the user's private key is recoverable from the certificate of recoverability by the escrow authorities. A result of false indicates that the private key is not recoverable. The invention is designed such that it is intractable for the user to generate a public key, and certificate of recoverability such that the key is not escrowed and such that it passes the verification process with a result of true. In the preferred embodiment, the users certify their public keys with registration authority of the certification authority (CA) who then signs their public key after successful verification. A public key together with a CA's signature on a string that contains the public key constitutes a certified public key. In more detail, upon receiving the user's public key, and certificate of recoverability, the CA verifies that the corresponding private key is recoverable. If it is, (namely, the verification process outputs true) the public key is certified and/or made publicly available by the CA. The user is only required to keep his public key and to have access to the public key database containing public keys of other users as in a typical PKI. In the recovery process, the escrow authorities use the user's certificate of recoverability, which is obtained from the CA, as an input signal. The escrow authorities process the certificate of recoverability, and the corresponding user's private key or data encrypted using the corresponding public key is the resulting output signal.

The present invention is useful in any environment that demands the recovery of private keys, or keys encrypted under these keys, or information encrypted under these keys. Such environments arise in law enforcement nationally and internationally, in the business sector, in secure file systems, etc. The successful escrowing of private keys implies the successful escrowing of public key encrypted information, and hence the present invention has many applications.

The present invention is robust with respect to any underlying technology since it can be implemented in both hardware and software. When implemented in software it can be easily scrutinized to insure that it functions as desired and to insure that it does not compromise the security of its users. The software implementation allows for fast and easy dissemination of the invention, since it can be disseminated in source code form over diskettes or over a computer communication network. The present invention is also as communication-free as is theoretically possible. The only communication is the act of disseminating the software itself (or the hardware device itself) and the one-time transmission of a user's public key, certificate of recoverability, and additional information. The signals can be processed quickly and the signals themselves constitute a small amount of information. The invention does not require changes in communication protocols used in typical unescrowed PKI's (e.g., session key establishment, key distribution, secure message transmission, etc.). The invention is therefore compatible with typical PKI's. The present invention thus provides a very efficient way of escrowing and recovering cryptographic keys.

THE DRAWING

The present invention will be described with reference to the accompanying FIGS. 1–7.

FIG. 3 is a data flow diagram of the process of verifying the recoverability of a private key.

FIG. 4 is a data flow diagram of the process of registering a key using the invention.

FIG. 5 is a data flow diagram of the process of private key recovery by the escrow authorities.

Figure 6:
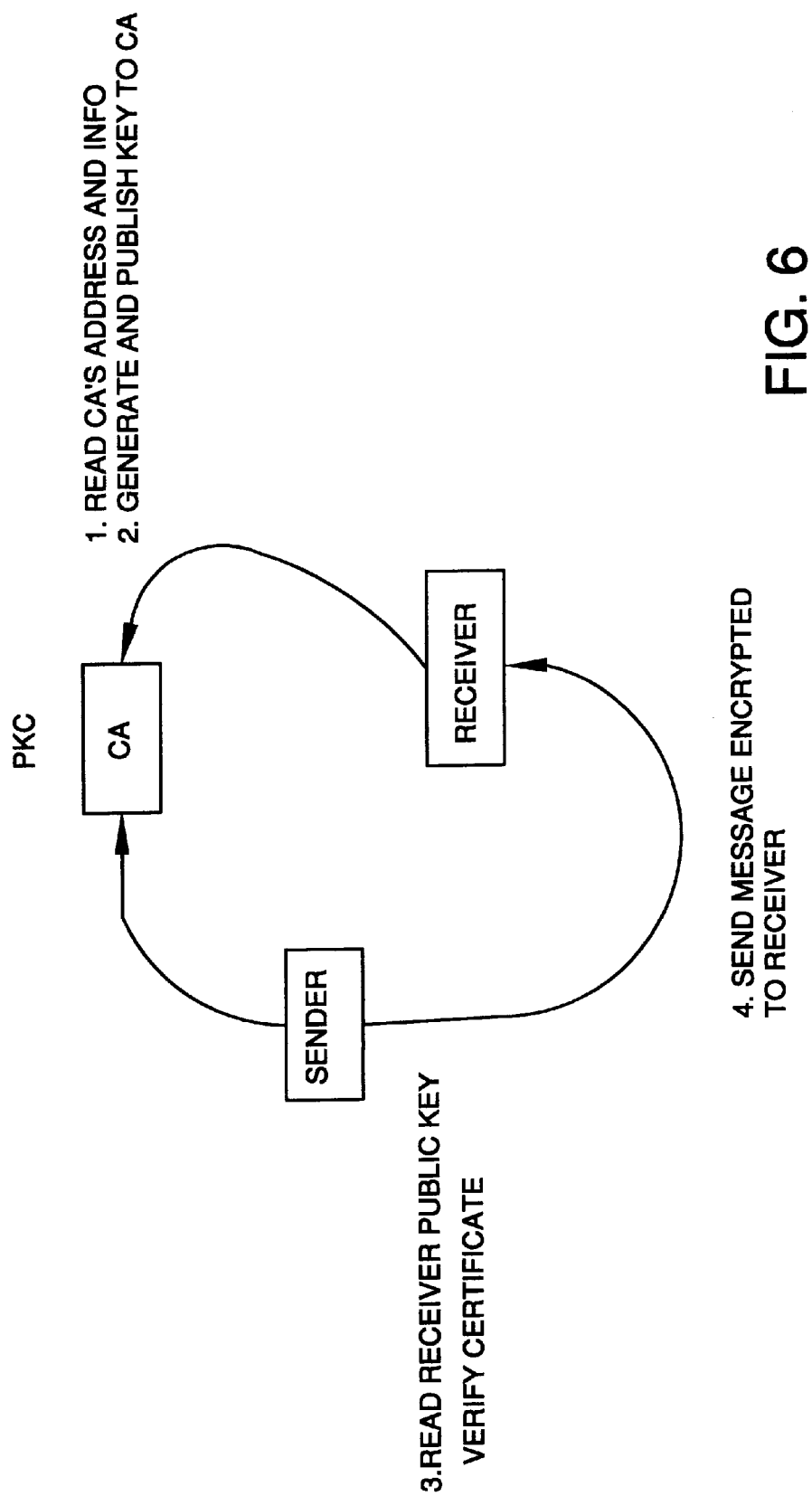
Figure 7:
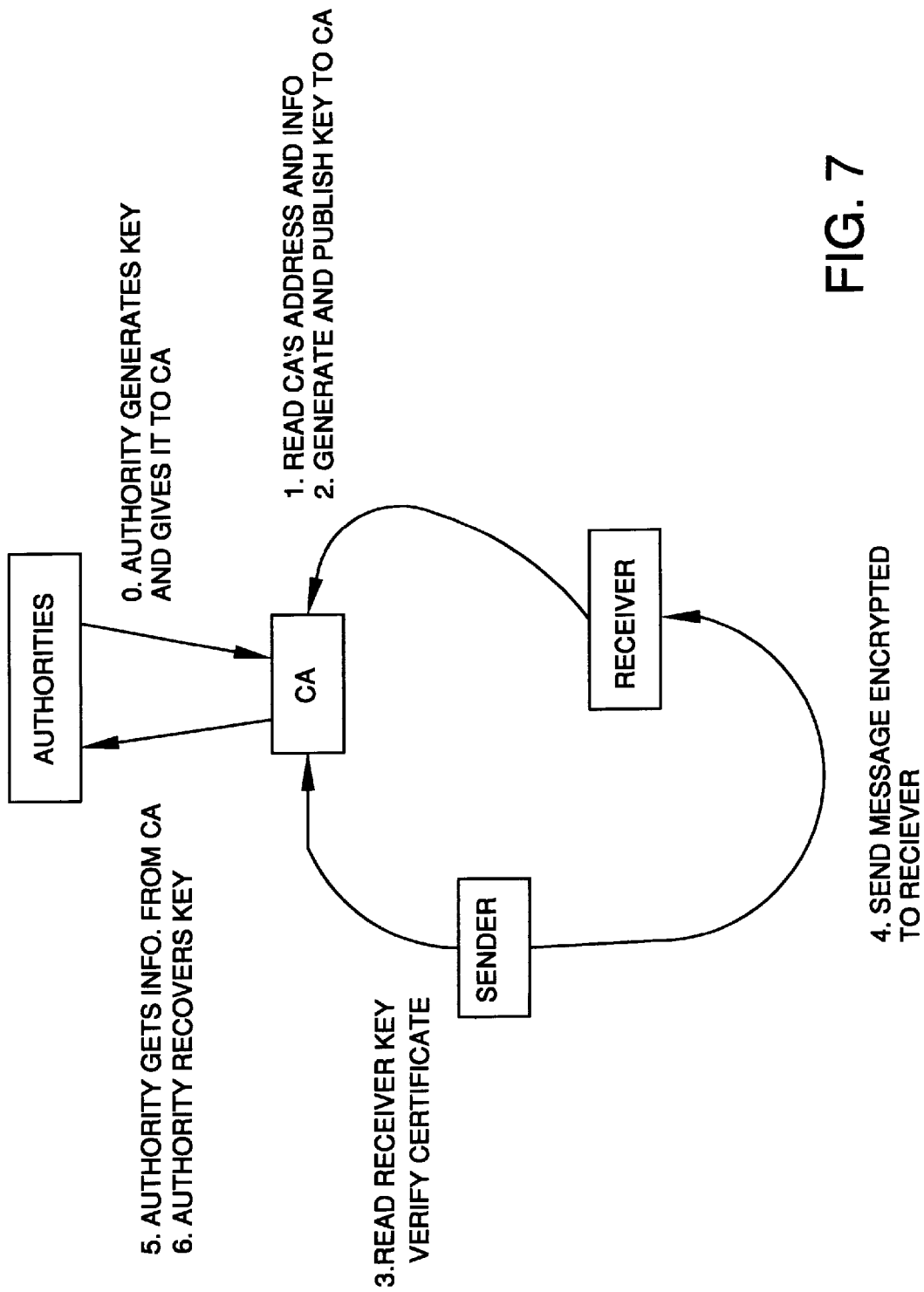

FIG. 6 describes a generic public key system and its main components and operations FIG. 7 describes the escrowable public key system which results by employing the present invention and its main components and operations.

DESCRIPTION OF THE INVENTION

The following is a description of the preferred embodiment of the present invention. Variations on the preferred embodiment will accompany the description of the preferred embodiment wherever applicable. For convenience in the presentation, the hashing algorithm selected is SHA (Schneier 2nd edition, pages 442–445), though any cryptographic hashing algorithm will suffice in its place. In the preferred embodiment, parameters are chosen uniformly at random from their respective groups. Alternate embodiments include alterations of the probability distributions from which such values are chosen.

Figure 1:
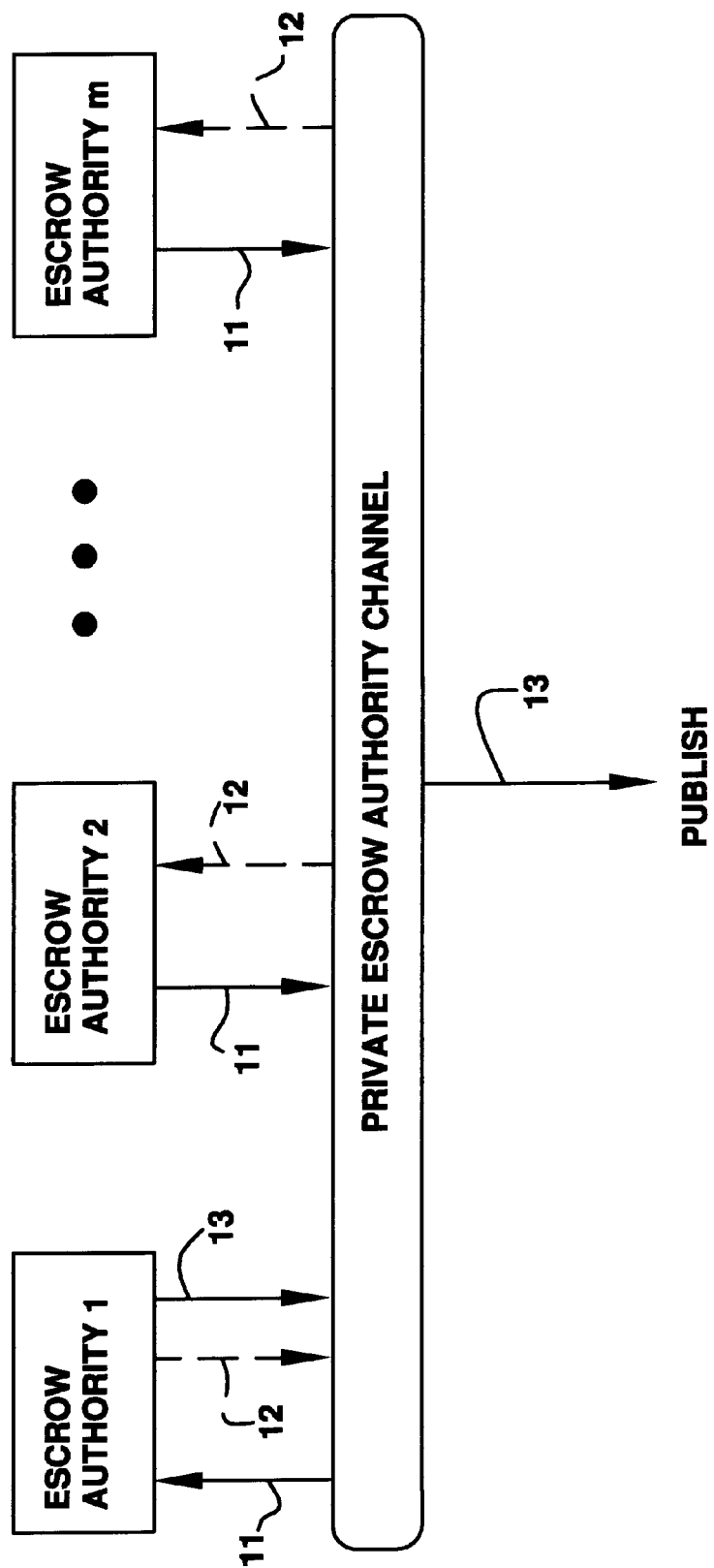
FIG. 1 is a data flow diagram of the process of setting up the method of the invention for use with m escrow authorities.

The system setup of the preferred embodiment shown in FIG. 1 initiates the cryptosystem. In the preferred embodiment, the participants agree upon a large prime r such that $q=2r+1$ is prime and $p=2q+1$ is prime. Examples of values for r that satisfy this relation are 5 and 11, though they are small values. The following is a 1024 bit value for r in hexadecimal:

fd90e33af0306c8b1a9551ba0e536023b4d2965d3aa813587
ccf1aeb1ba2da82489b8945e8899bc546dfded24c861742d
2578764a9e70b88a1fe9953469c7b5b89b1b15b1f3d7759
47a85e709fe97054722c78e31ba202379e1e16362baa4a6
6c6da0a58b654223fdc4844963478441afbbfad7879864fe
1d5df0a4c4b646591

An r of size 1024 bits is large enough for use in cryptographic systems. Such values of r, q, and p are not as easy to find as merely finding a prime number, but doing so is not intractable. What is needed is highly efficient algorithms which can be implemented using, say, a multiprecision library. Such algorithms include Karatsuba multiplication, Montgomery reduction, addition chains, and the Rabin- Miller probabilistic primality test (J. Lacy, D. Mitchell, W. Schell, "CryptoLib: Cryptography in Software," AT&T Bell Laboratories, cryptolib@research.att.com).

The following method can be used to find large values for r, q, and p efficiently. Note that r mod 3 must be 2. It can't be 0 since then r wouldn't be prime. It can be 1 since then q would be divisible by 3. Also, r mod 5 must be 1 or 4. It can't be 0 since then r would be divisible by 5. It can't be 2 since then q would be divisible by 5. It can't be 3 since then p would be divisible by 5, etc. We call this method "trial remaindering". By performing trial remaindering, we can throw out values for r, q, and p quickly prior to performing trial divisions and probabilistic primality tests. Once we perform trial remaindering up to, say, 251, we perform trial divisions on r, q, and p. If r, q, and p are not thrown out we then do the Rabin-Miller primality test on r, then q, then p, then r, then q, etc. alternating between the three. We do so using small potential witnesses of compositeness that are fixed in advance. If any of r, q, or p are found to be composite, we set r to be equal to r+2×3×5×. . . ×251 and repeat starting with trial divisions and the same set of potential witnesses. This way we need not perform trial remaindering again, since the prior conditions on r are assured. Once r, q, and p are found, we perform additional primality tests using potential witnesses that are found using a strong random number generator. If r, q, and p pass these tests, then they are assumed to be prime and are declared as systems parameters.

The participants agree upon, or the CA chooses, a value g which generates $(1, 2, 3, \ldots, p-1) = Z_p$, and an odd value $g_1$ which generates $Z^*_{2q}$. Note that 2q is a multiplicative group and has a generator. g and s are odd in the preferred embodiment. The values r, q, p, g, and $g_1$ are the systems initial parameters and are made publicly available with no loss of security. They can be chosen by the authorities themselves and/or anyone else. Once $g_1$ and q are specified, the m authorities (m≧1) proceed to collectively compute an escrow authority public key (Y, $g_1$, 2q), also called the escrowing public key, and escrow authority private keys $z_1$, $z_2$, $\ldots$, $z_m$. To do so, authority i, where i ranges from 1 to m, chooses a value $z_1$ in $Z_{2r}$ at random and then sets $Y_1$ to be $g_1$ raised to this value modulo 2q. At least one authority then receives all of the information of the $Y_1$'s from the m−1 other escrow authorities. In the preferred embodiment, authority i, where i ranges from 2 to m, sends $Y_1$ to authority 1. The sending of the $Y_1$'s is depicted by step 11 in FIG. 1. Y is computed to be the product of the $Y_1$'s modulo 2q by at least one of the authorities. In the preferred embodiment, Y is computed by authority 1. Authority 1 then verifies that $(g_1/Y)$ is a generator of $Z^*_{2q}$. If it isn't then step 12 is executed. In step 12 the other m−1 authorities are told to choose new values for z, hence the procedure is restarted from the beginning of step 11. In the preferred embodiment, authority 1 chooses $z_1$ over again also. In an alternative embodiment, at least 1 and less than m of the authorities generate new values for z. This process is continued as many times as necessary until $(g_1/Y)$ is a generator of $Z^*_{2q}$. Y is then published, or otherwise made available to the users and the CA, by one or more of the escrow authorities. This is depicted by step 13 in FIG. 1.

Figure 2:
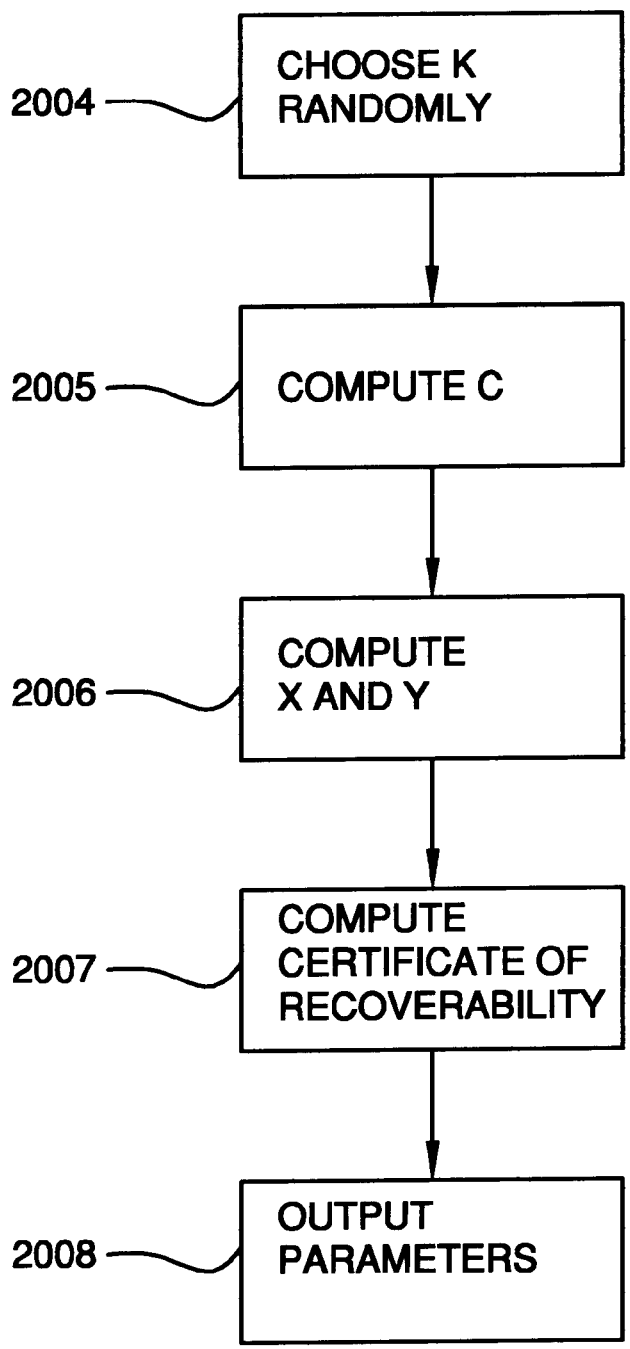
FIG. 2 is a flow chart of the basic steps of the process of generating a public/private key pair and certificate of recoverability using the invention.

FIG. 2 is a diagram showing the process of how a user's system generates a public/private key pair and a certificate of recoverability. Having obtained the signal Y that is made available to users by the escrow authorities, the user system proceeds to generate an ElGamal key (y, g, p) for the user. The signal Y may a priori have been included in the invention. The invention proceeds by choosing a value k in $Z_{2r}$ randomly. This is depicted by step 2004 in FIG. 2. In step 2005, the invention computes $C = g_1^k \bmod 2q$. In step 2006 the invention computes the user's private key x to be $(g_1^k / Y^k) \bmod 2q$. The invention also computes y to be $g^x \bmod p$.

The system then proceeds to step 2007 and computes a certificate that can be used by any interested party to verify that the user's private key is properly encrypted within C. The certificate contains the value v, which is computed by the system to be g raised to the power w mod p, where w is $1/Y^k \bmod 2q$. The public key parameter y can be recovered from g and v by computing v raised to the C power mod p. The system also processes three non-interactive zero-knowledge proofs as they are called in the art and includes them in the certificate. Let n denote the number of repetitions in each non-interactive proof. In the preferred embodiment, n is set to be 40. The first proof is designed so that the user can prove that he or she knows k in C. The second proof is designed so that the user can prove that he or she knows k in v. The last proof is designed so that the user can prove that he or she knows k in v raised to the C power mod p. By saying "the user knows value x" we mean that the system has value x in its state.

In more detail, to construct the non-interactive proofs, the system proceeds as follows. It chooses the values $e_{1,1}$, $e_{1,2}$, $\ldots$, $e_{1,n}$, $e_{2,1}$, $e_{2,2}$, $e_{2,3}$, $\ldots$, $e_{2,n}$ and $e_{3,1}$, $e_{3,2}$, $e_{3,3}$, $\ldots$, $e_{3,n}$ in $Z_{2r}$ randomly. For i ranging from 1 to n, the system sets $I_{1,i}$ to be $g_1$ raised to the $e_{1,i}$ power mod 2q. For i ranging from 1 to n, the invention sets $I_{2,i}$ to be v raised to the $d_i$ power mod p, where $d_i$ is Y raised to the $-e_{2,i}$ power modulo 2q. For i ranging from 1 to n, the invention sets $I_{3,i}$ to be y to the $t_i$ power mod p, where $t_i$ is $(g_1/Y)$ raised to the $e_{3,i}$ power mod 2q. The invention then computes the value rnd to be the SHA hash of the set formed by concatenating together the tuples $(I_{1,i}, I_{2,i}, I_{3,i})$ for i ranging from 1 to n. Note that rnd is a function of all of the I values, using a suitably strong cryptographic hash function. In alternate embodiments, the hash function can have an effective range of size different than 160 bits. A greater range of the hash function allows for significantly larger values for n. The system sets each of the bit-sized values $b_{1,1}, b_{1,2}, \ldots, b_{1,n}$, $b_{2,1}, b_{2,2}, \ldots, b_{2,n}, b_{3,1}, b_{3,2}, \ldots, b_{3,n}$ to be each of the corresponding 3n least significant bits of rnd. There are a multitude of ways in which an embodiment can securely assign the bits of rnd to the values for b. The values for b are the challenge bits, and this method of finding them is known as the Fiat-Shamir Heuristic. The system then proceeds to compute the responses to these challenge bits. For i ranging from 1 to 3 and for j ranging from 1 to n, the invention sets $z_{i,j}$ to be $e_{i,j} + b_{i,j} k \bmod 2r$. This completes the description of step 2007 of FIG. 2.

The system proceeds to step 2008. In step 2008, the invention outputs the parameters C, v, y, $(I_{1,i}, I_{2,i}, I_{3,i})$, and $(z_{1,i}, z_{2,i}, z_{3,i})$ for i ranging from 1 to n. In an alternate embodiment the value k is output by the invention to the user. The user then has the option to later interactively prove that his or her private key x is recoverable by the escrow authorities. This will be addressed in more detail later. Also, the values b can be made a part of the certificate. This step is however, not necessary, since the values for b can be derived from the values for I alone.

The description of the embodiment has thus far explained how the system is setup for use by the CA and authorities, and how the system is used by users (potential receivers) to generate public/private key pairs and certificates of recoverability. These certificates are strings showing to anyone presented with them that the key generated has the publicly specified properties. The following describes how the invention is used by the user to prove to a verifier that x is recoverable from C. This process is depicted in FIG. 3. The verifier can be the CA, an escrow authority, or anyone else who is part of the system.

The verification process of FIG. 3 is as follows. In step 3009, the user generates a public/private key pair, encryption of x, and a certificate using the invention as described above. In step 3010, the user transmits a signal containing these parameters to a verifier. In step 3011 the verifier uses this signal to verify whether or not the user's private key is recoverable by the escrow authorities. To do so, the verifier uses the user's public key, the encryption C, the corresponding certificate, and the escrowing public key Y.

The way in which the users signal is processed will now be described in detail. The verifying system outputs a 0 if the public key and/or certificate are invalid, and a 1 otherwise. The invention may take subsequent action and indicate to the verifier that the public key is invalid in the event that 0 is returned. Similarly, the verifying system may inform the verifier of a validation that passes.

To perform the verification, the verifying system verifies the three non-interactive proofs contained within the certificate of the user. The invention computes $(b_{1,i}, b_{2,i}, b_{3,i})$ for i ranging from 1 to n in the same way as performed during the certificate generation process. Recall that this process was described in regards to FIG. 2.

For the first non-interactive proof, the verifying system checks that $g_1$ raised to the $z_{1,i}$ power equals $CI_{1,i}$ mod 2q if $b_{1,i}=1$, for i ranging from 1 to n. The verifying system also checks that $g_1$ to the $z_{1,i}$ power equals $I_{1,i}$ mod 2q if $b_{1,i}=0$, for i ranging from 1 to n. If any of these equalities fails, then the verifying system returns a value of 0. This completes the verification of the first non-interactive proof.

For the second non-interactive proof, the verifying system checks that g raised to the $w_i$ power equals $I_{2,i}$ mod p if $b_{2,i}=1$, for i ranging from 1 to n. Here $w_i$ is 1/Y raised to the $z_{2,i}$ power mod 2q. The verifying system also checks that v to the $v_i$ power equals $I_{2,i}$ mod p if $b_{2,i}=0$, for i ranging from 1 to n. Here $v_i$ is 1/Y to the $z_{2,i}$ power mod 2q. If any of these equalities fails, then the verifying system returns a value of 0. This completes the verification of the second non-interactive proof.

For the third non-interactive proof, the invention checks that g raised to the $w_i$ power equals $I_{3,i}$ mod p if $b_{3,i}=1$, for i ranging from 1 to m. Here $w_i$ is $(g_1/Y)$ raised to the $z_{3,i}$ power mod 2q. The invention also checks that y to the $v_i$ power equals $I_{3,i}$ if $b_{3,i}=0$, for i ranging from 1 to m. Here $v_i$ is $(g_1/Y)$ raised to the $z_{3,i}$ power mod 2q. If any of these equalities fails, then the verifying system returns a value of 0. If all of the checks pass, then the value 1 is output by the verifying system.

In FIG. 4, the user certifies his or her public key with the CA. In step 4012 of this process, the user generates his or her public key and certificate of recoverability, as previously described. The user transmits this signal to the CA. This corresponds to step 4013 of FIG. 4. In step 4014 the CA acts as a verifier and verifies that the user's private key is recoverable by the escrow authorities. So far, steps 4012 through 4014 are identical to steps 3009 through 3011 in the key verification process of FIG. 3. However the CA, in addition, will make keys that pass the verification process available to others upon request and/or certify them. If the user's public key fails the verification process, then either the certification attempt is ignored, or alternatively the user is notified of the failed certification attempt.

Depending on the demands of the environment in which the invention is used, users may be required to submit extra information in order to register a public key and to certify that they know the private key portion without divulging it. Such information could be a password, social security number, previously used private key, etc. In the case that the CA is a trusted entity, the CA can simply digitally sign the user's public key, and make the key along with the CA's signature of that key available on request. If the CA is not trusted, then the certificate should be stored in the public file and the certificate together with the certificate of recoverability should be given to the escrow authorities, who intern can insure recoverability. This completes the description of the public key certification process.

The last process to describe is the private key recovery process. This process is depicted in FIG. 5. In this process, the invention is used by the n escrow authorities to recover the user's private key based on C. In this process, all m of the escrow authorities obtain C, as depicted in step 5015 of FIG. 5. In an alternate embodiment the CA transmits C and/or other parameters to one or more of the authorities. Thus they are already in possession of C. At this point escrow authority 1 computes $t_1$ to be C raised to the $z_i$ power mod 2q. Recall that $z_i$ is the private key of the ith escrow authority. This is done for i ranging from 1 to m. Authorities 2 through m then send their respective values for t to authority 1, as depicted in step 5016. Authority 1 then computes $Y^k$ mod 2q to be the product of the values for $t_i$ where i ranges from 1 to m. Authority 1 then obtains the user's private key x by computing $x=(C/Y^k)$ mod 2q. There are alternative methods in the art for computing x so that x is represented distributively among the authorities. These methods also allows the authorities to decrypt messages encrypted under the public key corresponding to x, without revealing x itself.

What has been described is an Auto-Recoverable and Auto-Certifiable (ARC) cryptosystem. The users of such a cryptosystem employ the public key system in a way that is identical to a typical PKI for secure communications. This is demonstrated schematically in FIGS. 6 and 7. FIG. 6 is a typical public key cryptosystem in a PKI environment. The following are the steps that are followed by the users. (1) The user first reads the CA's information and address. (2) The user generates a public/private key pair and sends the public key to the CA. The registration of the authority in the CA verifies the identity of the user, and publishes the public key together with the CA certificate on that key, identifying the user as the owner of that key. (3) For another user to send a message to that user, the public key is read from the CA's database and the certificate is verified. (4) Then, the message is encrypted under new the public key and sent. FIG. 7 schematically describes the ARC cryptosystem. The additional operations are as follows. (0) The authority generates the escrowing public key and gives it to the CA. Steps 1 and 2 are analogous, except that a proof is sent along with the public key. Steps 3 and 4 are the operation of the system and are identical. Steps 5 and 6 describe the case in which keys are recovered from escrow. (5) The escrow authority gets information from the CA. (6) The escrow authority recovers the user's private key.

In an alternative embodiment any large enough subset of the authorities can recover the private key x or messages encrypted under the public key corresponding to x without revealing x itself. This is done independently by receiving the appropriate values for t by the other authorities. This adds robustness in the case that some or all of the authorities cannot be completely trusted or are otherwise unavailable. Also, the authorities can require that the certificate of recoverability be sent along with the public key and encryption so that the user's parameters can first be verified using the verification process. This completes the description of the private key recovery process.

The following are a few alternate embodiments of the present invention. An alternate embodiment of this invention involves using an authority public key of the form $(Y, g, 2q^t)$, where t is some integer greater than 1. We chose t to be 1 in our preferred embodiment, though other values can be used instead and still operate based on primitive roots. Another alternate embodiment is to use the product of two or more large primes as part of the public parameters. Clearly, the exact structure of the moduli used can vary significantly without departing from the scope of the invention. In another embodiment, the interactive versions of the three non-interactive proofs can be used. Such an embodiment requires that the system output k to the user during key generation. This value k is used during the interactive protocol, so that the verifier can be convinced that the user's private key is recoverable by the escrow authorities. Note that by outputting k, however, a shadow public key cryptosystem may result. This follows from the fact that $((g_1, C, 2q), k)$ is a valid ElGamal public/private key pair mod 2q.

In yet another embodiment, the CA, or other trusted entity, takes the further action of blinding the user's public keys. The CA chooses a k s.t. $g'=g^k$ mod p is a generator, and sends the user $(g', y^k$ mod p$)$. g' is the user's ElGamal generator and $y'=y^k$ mod p is part of the users final key $(g', y', p)$. This prevents users from exploiting subliminal channels in y.

In another variant the users publish their public keys which are used for key exchanges in a Diffie-Hellman like "key-exchange". For example, the following method can be used. Let a be user A's private key and let b be the user B's private key. Let $y_a=(g$ to the power a) mod p be user A's public key and let $y_b=(g$ to the power b) mod p be user B's public key. To establish a random session key, user B chooses a random string s. User A then sends $m=(y_b$ to the a power)s mod p to user B. User B recovers s by computing $m/(y_a$ to the power b) mod p. Users A and B derive a session key from s using a known public function (e.g., applying it to a one-way hash function). Later, when the session key is required to be taken out of escrow, the trustees can use either a or b to recover s, and hence the session key.

An application of this invention is an multi-escrow authority system where each escrow authority has its own CAs and users. When users from two different escrow authorities conduct secure communication the two escrow authorities can retrieve the user's messages or keys and exchange them through bilateral agreement. This is applicable to international multi-country scenarios.

Another application of key escrow systems is a secure file system or file repository system with recoverable keys. Such a system can be implemented based on the precious embodiments, in particular based on the preceding paragraph. For example, user A can be the owner of the file, user B can be the file server, and the trustees can be file recovery agents. An example of a file could be a password, in which case, the file recovery agents are password recovery agents.

Thus, there has been described a new and improved key escrow system, its variants, and applications. It is to be understood that the preferred embodiment is merely illustrative of some of the many specific embodiments which represent applications of the principles and paradigms of the present invention. Clearly, numerous and alternate arrangements can be readily devised by those who are skilled in the art without departing from the scope of the present invention.

The above description of our cryptosystem makes novel uses of number theory in cryptography. It shows how to design a cryptosystem based on three primes with direct arithmetic relations between all them. That is r, q, and p are primes such that $q=2r+1$ and $p=2q+1$. The usage of three or more primes with relations between them can produce various cryptosystems of a similar nature to the one described above. Some of them are described in the variation on the preferred embodiment. Another relation can be $p=2q+1$ and $q=2rs+1$ where p, q, r, and s are all prime and r is 160 bits in length. Another example is $p=2q+1$, $q=2r+1$, and $r=2s+1$ where p, q, r, and s are all prime numbers. Furthermore, another innovative use of number theory is performing cryptographic operations in the exponent, where the operations are, for example, modular exponentiations. For example, the second zero-knowledge proof in step 2007 of the invention involves proving knowledge of k in v where v is equal to g raised to the w power mod p, where w is (Y raised to the $-k$ power) mod 2q. The use of three or more domains in successive exponentiations adds flexibility and power to cryptosystems. Applications of this fact along the lines of the present invention, are readily available to those who are skilled in the art.

What we claim is:

1. A method and apparatus for generating public keys and a proof that the keys were generated by a specific algorithm comprising the steps of:

the user's system generating a random string of bits based on system parameters;

the user running a key generation algorithm to get a secret key and public key using the random string and public parameters;

the user constructing a proof being a string of bits whose public availability does not compromise the secret key and wherein said constructing of said proof requires access to said secret key, but at the same time said proof provides confidence to at least one of a plurality of other entities that said public key was generated properly by the specified algorithm, and wherein said confidence is gained without having access to any portion of said secret key.

2. A method and apparatus for generating public keys and a proof that the keys were generated by a specific algorithm comprising the steps of:

the user's system generating a random string of bits based on system parameters;

the user running a key generation algorithm based on system parameters to get a pair comprised of a secret key and a public key using the random string and public parameters;

the user engaging in a protocol with at least one of a plurality of other entities whereby the said other entity repeatedly sends a challenge string and said user sends a response based on the challenge and the public key which requires access to the secret key, such that the public availability of said challenges and responses does not compromise the secret key, but at the same time provides confidence to said other entity that said public key was generated properly by the specified algorithm, and wherein said other entity has no access to any portion of said secret key.

3. A method and apparatus for publishing public keys and a proof that the keys were generated by a specific algorithm comprising the steps of:

the user's system reading the system parameters;

the user's system running a key generation algorithm to get a private key and public key;

the user's system constructing a proof that the private key was generated properly using the system parameters, and where said constructing of said proof requires access to said private key and verification of said proof can be performed by any other entity with no access to any portion of said private key.

4. A method and apparatus for publishing public keys and a proof that the corresponding private keys are recoverable by a predetermined entity comprising the steps of:

the user generating the keys based on input which is the system parameters;

the user sending a string along with the public key, the string being a proof that the corresponding private key is recoverable by said predetermined entity using public information, wherein the construction of said proof requires access to said private key and verification of said proof can be performed with no access to any portion of said private key.

5. A method and apparatus for registering users into a Public Key Infrastructure (PKI) such that a user and his public key is registered only upon verifying that the key was generated according to a specific algorithm comprising the steps of:

the user generating the keys as in claim 3, and in addition:

the user proving its identity to a registration authority;

the user sending to the registration authority the public key and a proof of the fact that the private key was generated according to a specific algorithm, and where said proof is based on access to said private key of the user corresponding to said public key;

if the registration authority is convinced of the validity of said fact and of the user's identity, then a certification authority issues a certificate for user's said public key, wherein said validity can be ascertained without access to any portion of said private key.

6. A method and apparatus as in claim 5 with an additional step wherein the registration authority, after verifying the validity of said proof and concluding that said proof holds, publishes together with said user ID, said public key in at least one of a public key database, a record given to said user including a signature on said user's said public key using said registration authority's private key, a public-key database kept by the registration authority, an X.509 certificate, and if verifying the validity of said proof does not lead to the conclusion that said proof holds, said registration authority does not publish said public key.

7. A method and apparatus as in claim 5 with the additional step wherein said registration authority modifies said user's public key to create a modified public key to be published.

8. A method and apparatus for registering users into a Public Key Infrastructure such that a user and his public key is registered only upon verifying that the corresponding private key is recoverable by a predetermined entity comprising the steps of:

the user generating the keys as in claim 4, and in addition:

the user proving its identity to a registration authority;

the user sending to the registration authority the public key and a proof of the fact that the corresponding private key is recoverable by said predetermined entity using public information, wherein construction of said proof requires access to said private key;

if the registration authority is convinced of the validity of said fact and of the user's identity, then a certification authority issues a certificate for user's said public key, and if the registration authority is not convinced of said validity then it does not issue a certificate for said public key.

9. A method and apparatus for a key recovery agent to recover the user's private key or information encrypted under said user's corresponding public key based on the certified public key of said user available in the public key directory and public parameters comprising of the following steps:

the key recovery agent reading the user's certified public key from the public key directory;

running a key recovery algorithm based on the following inputs: said user's certified public key, the public system parameters, and the private key of said recovery agent;

running said key recovery algorithm resulting in the private key of said user.

10. The method as described in claim 9 wherein the said recovery agent runs a key recovery algorithm based on the following inputs: said user's certified public key read from the public key directory, the proof corresponding to said public key read from the registration authority, the public system parameters, and the private key of said recovery agent.

11. A method and apparatus for a set of key recovery agents to recover the user's private key or information encrypted under said user's corresponding public key based on the public key of said user available in the public key directory and public parameters comprising of the following steps:

a subset of said set of key recovery agents read the user's public key from the public key directory;

each member of said subset run a key recovery algorithm based on the following inputs: said user's certified public key, the public system parameters, and the private key of said member of said subset;

running said key recovery algorithm resulting in a partial result of member of said subset;

all said partial results of said members of said subset are combined to generate said secret key of said user.

12. The method as described in claim 11 wherein each said recovery agent runs a key recovery algorithm based on the following inputs: said user's certified public key read from the public key directory, the proof corresponding to said public key read from the registration authority, the public system parameters, and the private key of said member of said subset.

13. A cryptosystem wherein the private key agreed upon by the users is available to the key recovery agent or agents comprising the steps of:

a first user, based on its own private key and a second user's public key, generates a resulting string;

said second user, based on its own private key and said first user's public key, generates said resulting string;

said resulting string is recoverable by the key recovery agents.

14. A cryptosystem where the secret key agreed upon by the users is available to the key recovery agent or agents comprising the steps of:

a first user, based on a random input, system parameters, and a second user's public key, generates a signal and a resulting string;

said signal is transmitted to said second user;

said second user, based on its own private key and said signal, generates said resulting string;

said resulting string is recoverable by the key recovery agents.

15. A method and apparatus for generating and publicizing system parameters for a key escrow system whereby:

all parties agree upon two domains F1 and F2, where F1 is used by the escrow authority public key and F2 is used for the user public keys;

all parties agree on a value $g_1$ which generates F1 and a value g which generates F2;

escrow authorities generate at least one pair of public/private keys in domain F1.

16. A method and apparatus for generating and publicizing system parameters for a key escrow system whereby:

all parties agree upon two domains F1 and F2, where F1 is used by the escrow authority and is the domain of the exponent of domain F2, and domain F2 is used for the user public keys;

all parties agree on a primitive root $g_1$ of domain F1 and a primitive root g of domain F2;

each escrow authority chooses a private key $z_i$;

the escrow authorities generate a public key Y contained in domain F1 based on $g_1$ and each private key $z_i$.

17. A method and apparatus for generating public keys and a proof that the keys were generated by a specific algorithm where initially a mechanism for generating the system's public parameters is executed and then the user takes the following steps:

accessing the system parameters;

choosing a private key x in domain F1 randomly, and outputting x;

calculating a public key y in domain F2, and outputting y;

computing and outputting one or more non-interactive zero-knowledge proofs that establish that x is recoverable given y, public system parameters, and possibly other values as well.

18. A method and apparatus as described in claim 17 wherein said user's public key is cryptographically blinded to create a modified public key which is then published by the registration authority.

19. An apparatus for generating system parameters for conducting key escrow whereby:

a method for finding a large prime r such that q=2r+1 is prime and p=4r+3 is prime is used where all parties agree upon said large prime r, all parties agree upon a value g that generates the mathematical group $Z_p$ and an odd value $g_1$ such that $g_1$ generates all values that are less than 2q and are relatively prime to it (namely, $g_1$ generates $Z_{2q}^*$ which is isomorphic to Zq);

and where the escrow authorities generate a public key Y in the following manner:

each escrow authority i chooses $z_i$ in $Z_{2r}$ uniformly at random and computer $Y_i=(g_1$ raised to the power $z_i$) mod 2q;

the escrow authorities pool their values $Y_i$ and compute the Y to be the product of all the $Y_i$'s mod 2q;

if $(g_1/Y)$ mod 2q does not generate $Z_{2q}$ then the authorities choose the $z_i$ over again and repeat;

so that the public key of the authorities is $(Y,g_1,2q)$, and each of the $z_i$ are kept private by escrow authority i.

20. An apparatus for generating public keys and a proof that the keys were generated by a specific algorithm comprising the steps of:

choosing a value k in $Z_{2r}$ uniformly at random;

computing $C=(g_1$ to the power k) mod 2q;

solving for the private key x in (Y to the power k)x=C mod 2q;

computing the public key y=(g to the power x) mod p;

computing v=g raised to the ((Y to the power −k) mod 2q) power mod p;

computing P1, a non-interactive zero-knowledge proof of knowledge of k in C;

computing P2, a non-interactive zero-knowledge proof of knowledge of k in v;

computing P3, a non-interactive zero-knowledge proof of knowledge of k in (v to the power C) mod p;

so that the user's public key is (y,g,p) and the user's private key is x and where the proof that the public key (y,g,p) was generated by this specific algorithm is the string (C,v,P1,P2,P3).

21. A method and apparatus for an entity to verify the recoverability of a private key generated as in claim 20 comprising the steps of:

the entity obtaining the public key (y,g,p) and the proof which is the string (C,v,P1,P2,P3) which was supposed to have been computed as in claim 24;

the entity verifying each of the non-interactive zero-knowledge proofs P1, P2, and P3 as constructed in claim 20;

the entity taking the subsequent action of verifying the algebraic relations between y, v, C, and p; and where the verifier assumes that the private key x is not recoverable by the escrow authorities if any of the verifications fail, and where otherwise it is assumed that x is recoverable by the escrow authorities.

22. An apparatus for generating public keys and proving that the keys were generated by a specific algorithm comprising the steps of:

choosing a value k in $Z_{2r}$ uniformly at random;

computing $C=(g_1$ to the power k) mod 2q;

solving for the private key x in (Y to the power k)x=C mod 2q;

computing the public key y=(g to the power x) mod p;

computing v=g raised to the ((Y to the power −k) mod 2q) power mod p;

participating in an interactive zero-knowledge proof protocol demonstrating knowledge of k in C;

participating in an interactive zero-knowledge proof protocol demonstrating knowledge of k in v;

participating in an interactive zero-knowledge proof protocol demonstrating knowledge of k in (v to the power C) mod p;

so that the user's public key is (y,g,p) and the user's private key is x and where if all three zero-knowledge interactive proofs are verified then the user's public key (y,g,p) is published and said user's private key x is kept private by the user.

23. A method and apparatus for recovering the private key generated as in claim 22 comprising the steps of:

each escrow agent i obtaining the value C of the user whose private key is to be recovered;

each escrow agent i computing $s_i=(C$ to the power $z_i$) mod 2q;

the escrow agents pooling their values $s_i$;

the escrow agents computing (Y to the power k) to be the product of all of the $s_i$'s mod 2q;

the escrow agents computing x=C(Y to the power -k) mod 2q.

24. An apparatus for an entity to verify the recoverability of a private key generated as in claim 20 comprising the steps of:

the entity obtaining the public key (y,g,p) and the proof which is the string (C,v,P1,P2,P3) which was supposed to have been computed as in claim 20;

the entity verifying each of the non-interactive zero-knowledge proofs P1, P2, and P3 as constructed in claim 20;

where if one or more of the non-interactive proofs P1, P2, and P3 fail to verify then the verifier assumes that the private key x is not recoverable by the escrow authorities and otherwise it is assumed that x is recoverable by the escrow authorities.

25. A method and apparatus, using a public-key cryptosystem, for enabling a predetermined entity to monitor communications of users suspected of criminal activities while protecting the privacy of other users, wherein the escrow authorities produce shares of an escrowing public key, comprising the steps of:

having each user create a matching pair of private and public keys;

providing a certification authority with a certificate enabling said certification authority to verify that the certificate includes the user's secret key hidden using the escrowing public key;

upon a predetermined request, having the said escrow authorities use their own shares to reconstruct, for the predetermined requester, the secret key of a user suspected of criminal activity or certain information encrypted under public key corresponding to said private key of said user suspected of criminal activity, said certain information can be session keys or messages encrypted under session keys.

26. The method and apparatus as described in claim 25 wherein the predetermined entity is a government agency and the predetermined request is a court order.

27. The method and apparatus as described in claim 25 wherein the predetermined entity is a government or a group of governments and the trustees are representative of said government or said group of governments and the predetermined request is a court order recognized by said government or said group of governments.

28. A method and apparatus for registering users into a Public Key Infrastructure as described in claim 25, wherein the user functions are implemented as a hardware device.

29. A method and apparatus, using a cryptosystem, for enabling a predetermined entity to monitor communications of users suspected of criminal activities while protecting the privacy of law-abiding users, comprising the steps of:

having the trustees produce shares for an escrowing public key; having users produce public keys and certifying them;

upon a predetermined request, having the trustees use their shares to enable the entity to attempt to monitor communications of the suspected user during a time period specified in said predetermined request.

30. A method and apparatus, using a cryptosystem, for enabling a predetermined entity to monitor communications of users suspected of criminal activities while protecting the privacy of law-abiding users, comprising the steps of:

having the trustees hold pieces of information, wherein a piece of information is guaranteed to include a share of a secret decryption key; having users produce public keys and;

upon a predetermined request, having a given number of trustees each use the piece of information that includes the share of at least one secret decryption key to enable the entity to monitor communications to the suspected user.

31. The method and apparatus as described in claim 30 with the further step of:

characterizing the user's activities as unlawful if the entity is unable to monitor the user's communications.

32. The method and apparatus as described in claim 30 wherein a given minority of trustees are unable to reconstruct the secret key.

33. The method and apparatus as described in claim 30 wherein upon the predetermined request all of the trustees each use the piece of information.

34. A method and apparatus for revealing the user's secret value, comprising the steps of:

having the trustees hold pieces of information, wherein a piece of information includes a share of secret value and;

upon predetermined request, having a given number of trustees each use of the piece of information to reveal the share of the user's secret value to enable the entity to reconstruct the secret value at a prescribed time specified in the predetermined request.

35. A method and apparatus as in claim 34 wherein the registering authority functions are implemented as a hardware device.

36. A method and apparatus for revealing private keys of suspected users comprising the steps of:

having the trustees hold pieces of information, wherein a piece of information is guaranteed to include a share of a secret decryption key and;

upon a predetermined request, having a given number of trustees each use the piece of information that includes the share of at least one secret decryption key to enable the entity to monitor communications of the suspected user by recovering the private key corresponding to the suspected user's public key in the public key database.

37. A method and apparatus for certifying public keys comprising the steps of:

A) having the trustees generate and publish a set of system parameters

B) having each user generate a public/private key pair using the system parameters C) having each user prove to a registration authority that said user's private key (and information encoded under said user's public key) is recoverable by said trustees D) upon successful validation of said proof, publish said user's public key certificate authority certificate authority certificate includes at least the ID of said user, said public key of said user, and a digital signature of said registration authority on a string of information which includes at least said user's ID, and said public key of said user.

38. A method and apparatus as described in claim 37 wherein the proof of step C is non-interactive and the registration authority keeps said proof private.

39. A method and apparatus, using a cryptosystem, for enabling anyone in possession of the system's public parameters to confirm that each public key in the public key database is recoverable by the trustees.

40. A method and apparatus for a user in a cryptosystem to produce strings of information based on said user's key and a random string certifying that required public properties of said key hold.

41. A method and apparatus for a user in a cryptosystem to produce strings of information based on said user's key and a random string and another entity's public key, said strings of information certify that required properties of said user's public key hold and said strings of information also include an encryption of the private key corresponding to said user's public key encrypted under said entity's public key.

42. A method and apparatus for users in a PKI that enables each pair of users to establish a random session key comprising of the following steps:

the first user in said pair looks up the second user's public key and said second user looks up said first user's public key said pair of users exchange messages to establish session key upon a court order which allows tapping of said session, the trustees of said PKI reconstruct said random session key based on at least one of said pair of user's private keys.

43. A method and apparatus, using a cryptosystem, for enabling a predetermined entity to recover selectively the files of users comprising the steps of:

having the recovery authorities produce shares for a recovery public key;

having users produce public keys;

having users produce encrypted files, each file encrypted under a file key and stored, and;

upon a predetermined authenticated request of a user, having the recovery authorities use their shares to enable the user to restore the cleartext version of available encrypted files.

44. A method and apparatus for generating system parameters which are a set of primes related by arithmetic conditions comprising of at least one of the following steps performed in arbitrary order:

choosing a random fixed set of small potential witnesses of compositeness;

randomly choosing a candidate prime and generating other candidates based on said candidate prime and said arithmetic conditions;

checking the primality of said candidates using said fixed set of small potential witnesses of compositeness;

checking the primality of said candidates by trying to divide them by a fixed set of integers;

checking the primality of said set of candidates by verifying a set of remaindering conditions;

adding a fixed even number to one of said candidates of primality and repeating a certain number of times;

and where if any of the above steps fails then a new set of candidates of primality are chosen, and the entire process is repeated.

45. A method and apparatus for two key recovery agencies A and B to recover keys or information encrypted in an exchange between user 1 and user 2, where user 1's key is recoverable by agency A and user 2's key is recoverable by agency B and there the key recovery proceeds according to the following steps:

said agency A and said agency B bilaterally agree on a procedure for exchanging information recovered from communication between users from their respective jurisdictions who are suspected of criminal activity;

said agency A recovers said user 1's private key or information encrypted using the corresponding public key using the method as described in claim 10 where we call the said recovered information, information X;

said agency B recovers said user 2's private key or information encrypted using the corresponding public key using the method as described in claim 10 where we call the said recovered information, information Y;

said agencies A and B exchange information X and Y respectively according to said bilateral agreement.

46. A cryptosystem with keys based on three or more distinct prime numbers with arithmetic relations between them.

47. A cryptosystem with encryption and decryption operations and key generation whereby operations are performed in any of three domains, F1, F2, and F3 such that F1 is the exponent domain of F2 and F2 is the exponent domain of F3.

48. A cryptosystem whereby operations are performed in any of three domains, F1, F2, and F3 such that F1 is the exponent domain of F2 and F2 is the exponent domain of F3.

49. A method and apparatus for generating public keys and proving that the keys were generated by a specific algorithm comprising the steps of:

accessing system parameters as generated in claim 15;

choosing a private key x in domain F1 randomly, and outputting x;

calculating a public key y in domain F2 using g and x, and outputting y;

proving using one or more zero-knowledge validation procedures that x is recoverable given y, g, and public information.

50. A method and apparatus as described in claim 49 wherein said user's public key is cryptographically blinded to create a modified public key which is then published by the registration authority.

51. A method and apparatus for recovering the private key generated as in claim 49 comprising the steps of:

each escrow agent i obtaining y and the proof of recoverability of x of the user whose private key is to be recovered;

each escrow agent i computing a value $s_i$ based on y, $z_i$, and the proof of recoverability of x;

the escrow agents pooling their values $s_i$;

the escrow agents computing x based on the values $s_i$.

52. A method and apparatus for generating public keys and proving that the keys were generated by a specific algorithm comprising the steps of:

accessing system parameters as generated in claim 16;

choosing a private key x in domain F1 randomly, and outputting x;

calculating a public key y in domain F2 using g and x, and outputting y;

proving using one or more zero-knowledge validation procedures that x is recoverable given y, g, and public information.

53. A method and apparatus as described in claim 52 wherein said user's public key is cryptographically blinded to create a modified public key which is then published by the registration authority.

54. A method and apparatus for recovering the private key generated as in claim 52 comprising the steps of:

each escrow agent i obtaining y and the proof of recoverability of x of the user whose private key is to be recovered;

each escrow agent i computing a value $s_i$ based on y, $z_i$, and the proof of recoverability of x;

the escrow agents pooling their values $s_i$;

the escrow agents computing x based on the values $s_i$.

55. A method and apparatus for recovering the private key generated as in claim 17 comprising the steps of:

each escrow agent i obtaining y and the proof of recoverability of x of the user whose private key is to be recovered;

each escrow agent i computing a value $s_i$ based on y, $z_i$, and the proof of recoverability of x;

the escrow agents pooling their values $s_i$;

the escrow agents computing x based on the values $s_i$.

56. A method and apparatus for an entity to verify the recoverability of a private key generated as in claim 18 comprising the steps of:

the entity obtaining the public key y and the proof as constructed in claim 18;

the entity verifying all of the non-interactive zero-knowledge proofs as constructed in claim 18; where if one or more of the non-interactive proofs fail to verify then the verifier assumes that the private key x is not recoverable by the escrow authorities.

57. A method and apparatus for an entity to verify the recoverability of a private key generated as in claim 49 comprising the steps of:

the entity obtaining the public key y and the prof as constructed in claim 52;

the entity verifying all of the non-interactive zero-knowledge proofs as constructed in claim 52; where if one or more of the validation procedures fail to verify then the verifier assumes that the private key x is not recoverable by the escrow authorities.

58. A method and apparatus for an entity to verify the recoverability of a private key generated as in claim 52 comprising the steps of:

the entity obtaining the public key y and the proof as constructed in claim 53;

the entity verifying all of the non-interactive zero-knowledge proofs as constructed in claim 53; where if one or more of the validation procedures fail to verify then the verifier assumes that the private key x is not recoverable by the escrow authorities.

59. A method and apparatus for recovering the private key generated as in claim 20 comprising the steps of:

each escrow agent i obtaining the value C of the user whose private key is to be recovered;

each escrow agent i computing $s_i$=(C to the power $z_i$) mod 2q;

the escrow agents pooling their values $s_i$;

the escrow agents computing (Y to the power k) to be the product of all of the $s_i$'s mod 2q;

the escrow agents computing x=C(Y to the power −k) mod 2q.

\* \* \* \* \*